June 12, 1923.

W. E. ROWE

QUACK GRASS ERADICATOR

Filed July 21, 1921

1,458,441

INVENTOR.
W. E. ROWE.
BY HIS ATTORNEY.
James F. Williamson

Patented June 12, 1923.

1,458,441

UNITED STATES PATENT OFFICE.

WILLIAM E. ROWE, OF CROOKSTON, MINNESOTA.

QUACK-GRASS ERADICATOR.

Application filed July 21, 1921. Serial No. 486,506.

*To all whom it may concern:*

Be it known that I, WILLIAM E. ROWE, a citizen of the United States, residing at Crookston, in the county of Polk and State of Minnesota, have invented certain new and useful Improvements in Quack-Grass Eradicators; and I do hereby declare the following to be a full, clear, and exact description of the invention, such as will enable others skilled in the art to which it appertains to make and use the same.

This invention relates to a quack grass eradicator of the type disclosed and claimed in my co-pending application, S. N. 336,546, filed November 8th, 1919.

The purpose of the invention is to dig up the quack grass and the roots thereof and then to pick up the same and deliver it to a conveyer and gathering device.

It is an object of the present invention to provide an improved form of grass pick-up device, which device co-operates with a soil disintegrating and grass digging device.

The objects and advantages of the invention will be further apparent from the following description made in connection with the accompanying drawings in which like reference characters refer to the same parts throughout the different views, and in which, Fig. 1 is a plan view of the device;

Figure 1:
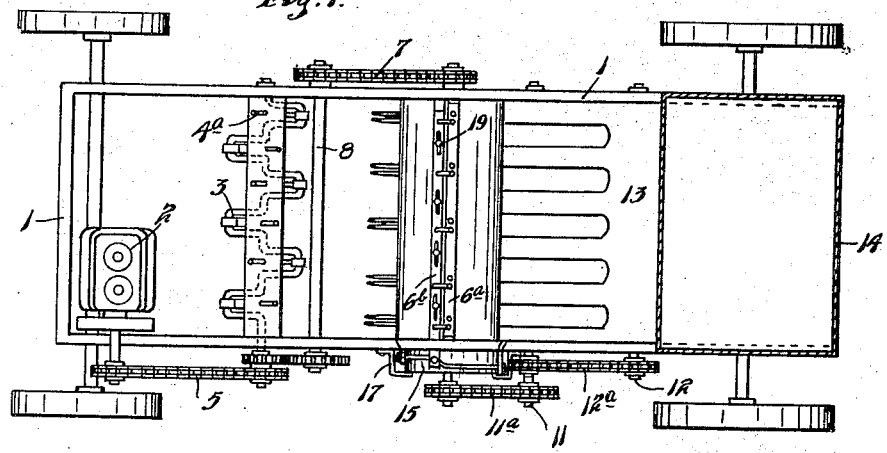
Figure 2:
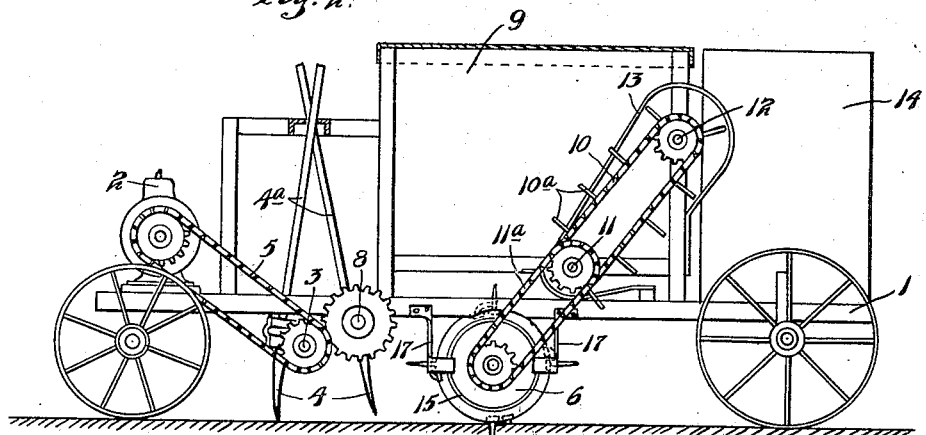
Fig. 2 is a view in side elevation thereof, a portion being shown in section.

Referring to the drawings, the device is seen to comprise a wheeled truck having a frame 1 upon which is mounted a motor 2 which furnishes the power for the various elements. A crank shaft 3 extends across the first part of the frame and has its ends journaled in suitable bearings therein and soil disintegrating and grass digging and loosening members 4 are journaled on the oppositely disposed crank portions of said shaft 3 and have upwardly projecting extensions 4ª which extend through apertures in a cross bar at the top of the frame by which they are suitably guided, and held in proper positions.

The crank shaft is driven by a chain 5 which runs over a sprocket on the end of the driving shaft of the motor 2 and over a sprocket on the end of the shaft 3. A roll 6 extends across the frame 1 beneath the same at some distance to the rear of the members 4 and is journaled in suitable bearings carried by said frame. This roll is provided at one end with a sprocket wheel over which runs a chain 7. This chain also runs over a sprocket wheel on the end of a shaft 8, which latter shaft is geared at one end to the shaft 3, as clearly shown in Fig. 1. The roll 6 is thus rotated by the motor.

The central part of the frame is enclosed by a box or casing 9 and an elevating and grass receiving member 10 is mounted therein. This member comprises spaced shafts 11 and 12 which carry sprocket wheels at each end thereof. An endless apron is attached to a chain running over these sprocket wheels and pins 10ª project outwardly from this apron. Spaced guard members 13 extend over the said apron between the rows of pins and are continued upward around the upper end of said apron and pins and secured to the rear end of the box 9.

The lower ends of the members 13 extend around the lower sprocket and are fastened to the top of the frame member 1. The sprockets on shaft 11 are driven by a chain 11ª running over a sprocket on the end of a shaft projecting centrally from the roll or drum 6 and another sprocket secured on the end of shaft 11. A chain 12ª also connects the sprockets on shafts 11 and 12. The member 10 is adapted to receive the picked up grass and roots from the roll member 6 and to carry the same upwardly to discharge them into the gathering member or receptacle 14. The said grass and roots will be freed from the pins 10ª as the same pass up along the guard members 13.

Figure 4:
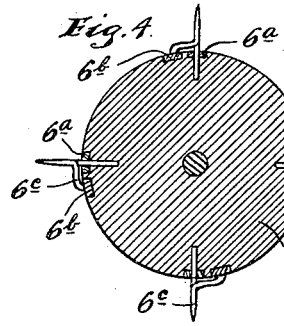
Fig. 4 is a vertical section on the line 4—4 of Fig. 3, looking in the direction of the arows.
Figure 3:
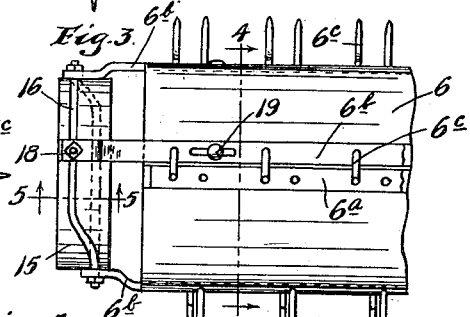
Fig. 3 is a partial view in side elevation on an enlarged scale of the grass picking roller.
Figure 5:
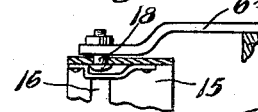
Fig. 5 is a sectional view on an enlarged scale of a portion of the roller mechanism taken on the line 5—5 of Fig. 3, looking in the direction of the arrows.

The roll 6 is provided about its periphery with a plurality of grooves of substantially rectangular shape in which are disposed bars 6ª and 6ᵇ. The bars 6ª are fixed relatively to the roll and carry spaced pins or fingers projecting radially outward therefrom and extending into said roll. The bars 6ᵇ are arranged to reciprocate in the grooves in which they are mounted and extend at one end of the roll 6, being bent to lie closely adjacent to the outer surface of the ring member 15 which is fixed relatively to the frame 1 and supported by brackets 17 secured to said frame. The roll 15 has formed therein a cam slot 16 and the bars 6ᵇ are equipped near their ends with headed and nutted bolts on which cam rollers 18 are mounted, said cam rollers being disposed in the groove 16. The bars 6ᵇ are provided with slots intermediate their lengths in which guide bolts 19 are disposed, said bolts being secured in the roll 6. The bars 5ᵇ also carry spaced teeth or fingers 6ᶜ which, as shown in Fig. 4, are bent substantially at a right angle to extend transversely of the roll, are then again bent to project outwardly radially, the radially projecting portions of these pins thus being disposed in substantially the same plane as the pins projecting from the bars 6ᵃ.

The operation of the device is as follows:

The truck will be drawn along the ground and the members 4 will be driven by the motor and will be moved in an approximately elliptical path and dig into the soil and disintegrate the same and thoroughly loosen and dig up the quack grass and roots. As the roll or drum 6 is turned, the cam rollers 18 on the bars 6ᵇ will travel in the cam slots 16, and owing to the shape of said slots will be reciprocated longitudinally. Thus, as the pins or fingers 6ᶜ move downwardly into the ground they will be reciprocated and brought into close proximity with the pins or fingers projecting from the bars 6ᵃ. The grass and roots will thus be gripped between the two series of teeth or fingers and the same carried upwardly to a position in the line of centers of shaft 11 and roll 6 where they will be engaged by the member 10. As the teeth or fingers reach the upper position, the bars 6ᵇ are again reciprocated and the two series of teeth or fingers separated so that the grass and roots will be discharged onto the elevating device 10. The grass and roots will be carried upwardly and discharged into the receptacle 14.

From the above description it is seen that applicant has provided a simple and very much improved form of grass pickup device by which the grass is positively gripped and lifted. The grass, therefore that might still have a slight adherence to the earth will be quickly freed and picked up together with the grass that is entirely loose. The parts of the device are simple and there is no tendency for the same to become disarranged or inoperative. The box 9 enclosing the conveying means, will prevent the grass and roots from being blown therefrom in a high wind.

It will, of course, be understood that various changes may be made in the form, details and arrangement of the device, without departing from the scope of applicant's invention, which, generally stated, consists in the matter shown and described and set forth in the appended claims.

What is claimed is:

1. A quack grass eradicator having in combination, soil disintegrating devices adapted to dig up and loosen the grass and roots thereof, and a device constructed and arranged to extend into the disintegrated soil and to grip and pick up the grass and roots and deliver the same to a conveyer.

2. A grass pickup device having in combination a cylindrical ground-engaging roller, two series of soil piercing teeth projecting from the periphery thereof, one series being arranged to approach the other and grip the grass and roots therebetween and to recede and discharge the same.

3. The structure set forth in claim 2, one series of said teeth being stationary.

4. A grass pickup device having in combination, a ground engaging roller, spaced pairs of bars mounted therein and extending longitudinally thereof, said bars having soil piercing teeth projecting outwardly therefrom and disposed in substantially the same longitudinal plane, one of each pair of bars being stationary and the other of each pair being movable, and means for longitudinally sliding said movable bars when said teeth are thrust into the ground and reciprocating the movement when the roller is further rotated.

5. The structure set forth in claim 4, said last named means comprising a cam disposed at the end of the ground engaging roller, and cam rollers on said movable bars for engagement therewith.

6. A grass pickup device comprising a ground engaging roller having rows of stationary teeth and rows of movable teeth, said teeth being adapted to be thrust into the soil when the roller is rotated and said movable teeth being adapted to approach said stationary teeth when thrust into the soil and to recede from said stationary teeth when the roller has completed a portion of one rotation.

7. A quack grass eradicator having in combination, soil disintegrating devices adapted to dig up and loosen the grass and roots thereof, and a device having movable teeth constructed and arranged to extend into the disintegrated soil and to pick up the grass and roots and deliver the same to a conveyor.

In testimony whereof I affix my signature.

WILLIAM E. ROWE.